Patented July 9, 1946

2,403,894

UNITED STATES PATENT OFFICE 2,403,894

ADDITIVES FOR LUBRICANTS

John D. Bartleson, Cleveland, Ohio, assignor to The Standard Oil Company, Cleveland, Ohio, a corporation of Ohio No Drawing. Application June 23, 1945, Serial No. 601,321

19 Claims. (Cl. 252—32.7)

This invention relates to lubricants and lubricant additives suitable for use under various conditions, including high temperatures or high pressures or both, as for instance, use in an internal combustion engine operating at higher temperatures and in which the lubricant is in close contact with metallic surfaces, metal compounds and high temperature gases, and use as gear lubricants when surfaces must be lubricated which are subjected to high pressures.

This application is a continuation-in-part of application Ser. No. 558,079, filed October 10, 1944.

It is an object of the present invention to provide an agent which may be useful itself as a lubricant, and which when added to lubricants will markedly inhibit the very objectionable deposition of lacquer, and, at the same time, inhibit acid and sludge formation, corrosion and other types of deterioration occurring under operating conditions.

A further object is the provision of lubricating oils containing such an addition agent.

Another object of this invention is to provide an agent which when added to lubricants will improve the extreme pressure characteristics thereof.

Another object of this invention is to provide heretofore unknown compositions made from raw materials not heretofore used in making products of this type, together with processes for their production.

Another object is to provide a novel composition which is superior in its functions to other compositions now available and intended for this same general purpose.

Other objects of this invention will be apparent as it is more fully disclosed hereinafter. All these objects are achieved in accordance with the more detailed description of the invention hereinafter.

It has been proposed heretofore to react $PCl_3$, $POCl_3$, and $PSCl_3$ with various amines In this proposal the temperatures used are relatively low, i. e., a maximum of 240° to 265° F. The art has suggested, contrary to fact, that $P_2S_5$ might be the equivalent of the above halogenated compounds. We have found that when $P_2S_5$ is reacted with an amine having at least twelve carbon atoms, and under the above conditions, the products are difficultly soluble in oil. We have also noted that during such a reaction no gaseous by-products are evolved.

It has now been found, and unexpectedly indeed, that if a phosphorus sulfide-amine reaction is conducted at a sufficiently high temperature, the reaction product will have a high solubility in lubricating oils and greases and that such products have highly advantageous properties as additives for lubricants. Alternatively, the reaction product may be made at a lower temperature and subsequently subjected to the high temperature. These products are particularly valuable as additives for so-called extreme pressure lubricants, and also as additives for lubricating oils to improve the corrosion, lacquer, sludge, viscosity increase, and the like characteristics thereof. In addition, if an element of the sulfur family, i. e., sulfur, selenium or tellurium, is incorporated into the product while or preferably after the products are subjected to the high temperature, still further improved additives are obtained. The metal derivatives formed from all of these sulfide-amine derived products also have these desired properties.

A method of preparing metal derivatives of the phosphorus sulfide-amine reaction products having the above properties is to prepare the phosphorus sulfide-amine reaction product under temperature conditions other than the high temperature and then to prepare the metal derivative thereof under the high temperature conditions. Where the high temperature condition is employed in the primary sulfide-amine reaction step, the step of forming the metal derivative may be conducted under temperature conditions other than the high temperature.

The high temperature conditions vary somewhat with the amine used, but in general the temperature must be at least about 400° F., and desirably in the range of about 430° to 530° F. and preferably about 500° F. at atmospheric pressure. Economy of heat suggests that a temperature higher than that necessary to carry out the reaction will be wasteful. The temperature should not be so high as to decompose the reaction product, and 600° F. may be viewed as a practical economic upper limit, although much higher temperatures produce a satisfactory product. The reaction time varies somewhat with the amine and the temperature and falls within the general range of from 1 minute to about 6 hours, desirably from about ¼ to about ¾ hour and preferably about ½ hour. The reaction is somewhat exothermic and on a commercial scale the heat evolved thereby may be used to maintain the temperature. The ingredients may be added in increments if this is desirable for temperature control or for other reasons.

The reactions may be carried out in the absence of air or in an atmosphere of an inert gas, such as nitrogen.

The sulfide-amine reaction may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, since a diluent is not necessary.

The reaction is usually complete in four hours or less time. The reaction time is a function of the temperature, the amount of the sulfide that is to react, the subdivision of the sulfide, rate of stirring, etc.

The amine or mixture of amines may be reacted with the sulfide or mixture of sulfides in mol ratios of one mol of amine to from 0.5 to 2.5 or more mols of sulfide. The unexpectedly large amount of the sulfide which can be consumed in the reaction is believed to be unique in the high temperature reaction. Even small amounts show a significant improvement. Economic factors may make it undesirable to use more than about 2.5 mols of the sulfide. Generally about 0.7 to 2.2 mols is the usual range that will be used, and about 1.0 to about 1.5 is especially desirable.

The pentasulfide is preferred although other phosphorus sulfides or mixtures of sulfides may be employed. Phosphorus pentasulfide is most economic and readily available and for this reason is used in the illustrative examples. Under suitable conditions sulfides of arsenic or antimony may be similarly employed.

A very large variety of amines have been found to react, for example, either aliphatic, aromatic or heterocyclic primary or secondary amines or derivative primary or secondary amines thereof; all of these contain at least one amine hydrogen, which is a hydrogen attached directly to the nitrogen. The choice may be controlled by the desired lubricant solubility characteristics of the primary sulfide-amine or the final metal derivative product. Primary and secondary aliphatic amines which have an aliphatic radical of at least twelve carbon atoms are preferred, and of these the mono- or di-octadecyl or hexadecyl amines or mixtures containing at least one of them are given as illustrative. Analogous polyamines may be used. Commercial dioctadecylamine is a commercially available amine and for this reason is used in many of the illustrative examples.

The amine stock may be a mixture of different amines of different molecular weight and degrees of substitution. Tertiary amines, although not as desirable, may be present. Generally, the more saturated amines are preferred.

The yield is very high and appreciable amounts of oil insoluble products are not formed. Generally the amount of sulfide is chosen so that it will all react at the temperature selected, and the reaction is continued until it is consumed. Associated with the high temperature treatment is the evolution of sulfur containing gas, for instance $H_2S$.

To achieve the additional improvement which results if additional sulfur is present in the additive, about 0.01 to 2.0 and preferably 0.1 to 0.5 gram atoms of sulfur per gram mol of the amine is desirable. This sulfur can be incorporated by adding elemental sulfur, preferably after the formation and cooling of the high temperature primary reaction product, and maintaining the mass at about 200° to 300° F. for about a few minutes to several hours, and preferably about one hour. Selenium and tellurium function in much the same way as sulfur in this respect, and may be incorporated similarly. The sulfur can also be added to the metal derivatives.

The sulfide-amine reaction products may be converted to their metal derivatives by reaction with one or more metal compounds, such as their sulfides, oxides or hydroxides. These metals may be one or more of the following: an alkali metal, such as sodium, potassium and lithium; an alkaline earth metal, such as calcium, barium, strontium; or aluminum or other metal lower than aluminum in the electromotive series, such as zinc, lead, chromium, cobalt, antimony, arsenic, tin, copper or molybdenum. The metal should be selected with reference to the use of the composition and the properties desired in it. The alkali and alkaline earth metals have excellent detergent characteristics. The heavier metals have surface corrosion inhibition characteristics. The preferred metals are group II and group III metals of the periodic table such as zinc, barium and aluminum.

If the primary phosphorus sulfide-amine reaction product was made at or heated to the high temperatures, as described heretofore, the second reaction of forming the metal derivatives may be carried out at temperatures in about the range of about 100° to 400° F., a temperature of about 180° to 250° F. being preferred. This reaction is also usually completed in four hours or less time, and the same factors as to reaction time are involved as discussed heretofore. Alternatively, if the primary sulfide-amine reaction product has not been subjected to the higher temperatures, the metal derivative should be prepared at or subjected to the higher temperatures as described heretofore. A diluent may be used, as described heretofore, in making the metal derivatives, but is not necessary. If a diluent is used in the sulfide-amine reaction, it can be carried over into this reaction step and be subsequently separated if desired. From about 0.25 to about 6.0 equivalents of the metal compound may be used per mol of the sulfide in the sulfide-amine reaction product, preferably about 1.0 to about 3.0 equivalents. An equivalent is the quotient of a mol divided by the valence of the metal concerned. The metal hydroxide is generally insoluble in the sulfide-amine reaction product and the amount that reacts is the amount that is no longer present as a solid phase in the reaction mass.

It is beneficial to have water present in the latter reaction, and this may be introduced as water of crystallization, or as a hydrate of the metal compound, or it may be introduced separately. A plurality of metals can be used such as sodium and calcium, calcium and barium, calcium or zinc and aluminum or tin. If the amount of the metal is small, the final product may be a mixture of the initial reaction product and the metal derivative. The yield in this second reaction is also very high. In the case of the barium compound, the yield is from 90 to 95%, and in the case of the potassium compound, the yield is almost 100%.

After the reaction is complete, the reaction mass is centrifuged or filtered to remove water and any traces of oil-insoluble by-product substances. If an excess of the basic metal compound is used, the unreacted excess may be separated at this stage. If a volatile solvent is used as a diluent, it may be removed by vacuum distillation at this stage.

These new compositions impart many desirable properties to lubricants to which they have been added. They act as very powerful detergents therein, and also as inhibitors of corrosion and lacquer and sludge formation. They improve the viscosity index and have a very striking effect as pour point depressants. They also improve the extreme pressure characteristics of lubricants.

The amount of the above described primary phosphorus sulfide-amine reaction product or metal derivative thereof to be added to an oil or grease will depend upon the characteristics of the oil or grease and the intended use. Some oils have more of a tendency to corrode metals, or to form acids, sludges and lacquer deposits than others, and such oils require larger quantities of the addition agent. Also oils that are intended for higher temperatures require larger amounts of the additive. In general, for lubricating oils the range is from 1 to 10% by weight but under some circumstances amounts as low as .01% show a significant improvement. For extreme pressure lubricants the range is from 0.5 to 25.0% by weight. As to an upper limit, of course, it may be uneconomical to add more than is necessary to impart to the lubricant the desired properties. Generally, not over about 50% would usually be used.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

*Example 1*

695 grams of commercial dioctadecylamine (a mixture of about three parts by weight of dioctadecylamine and one part of trioctadecylamine), 200 grams of phosphorus pentasulfide and 695 grams of No. 300 red oil (a conventional acid treated Mid-Continent lubricating oil base stock, S. A. E. 30 or slightly lower) were mixed, and heated to 500° F. and maintained at this temperature for 30 minutes, all in an atmosphere of nitrogen and with agitation. As it was being heated between 420° and 498° F., a considerable amount of gas which largely consisted of $H_2S$ was evolved by the mixture. The reaction mass was then filtered hot. 1443 grams of dark oily product was obtained. It was an about 50 weight per cent concentrate of the additive in the red oil. It analyzed 5.46% sulfur and 3.58% phosphorus, based on the concentrate.

*Example 2*

45 grams of mono-octadecylamine (C. P., analyzing 99% in purity), 56 grams of phosphorus pentasulfide, and 455 grams of No. 300 red oil were mixed, slowly heated to 500° F. and maintained at that temperature for 30 minutes, all in an atmosphere of nitrogen and with agitation. The weight loss during the reaction was 22 grams. Most of this was probably due to the $H_2S$ evolved during the reaction. The reaction mass was filtered hot. 54 grams of a brown insoluble material remained as a precipitate and 471 grams of a liquid product was obtained. The latter was an about 9 weight per cent concentrate of the additive in the red oil. The liquid product analyzed 4.90 weight per cent sulfur and 2.00% phosphorus.

*Example 3*

60.8 grams of mono-octadecylamine (C. P., analyzing 99% in purity), 74 grams of phosphorus pentasulfide and 182 grams of No. 225 red oil (a conventional acid treated Mid-Continent lubricating oil base stock, of S. A. E. 20) were mixed, slowly heated to 500° F., and maintained at this temperature for 30 minutes, all while in an atmosphere of nitrogen, and with agitation. The reaction mass was then filtered hot. 209 grams of filtrate was obtained. It was an about 25 weight per cent concentrate of the additive in the red oil.

Following the procedure of Example 1, phosphorus sulfide-amine products were prepared using various amounts of phosphorus pentasulfide and 100 grams of the commercial dioctadecylamine, all other conditions being unchanged, as follows:

| Example No. | Amount of phosphorus pentasulfide in grams |
|---|---|
| 4 | 39.4 |
| 5 | 41.5 |
| 6 | 48.0 |
| 7 | 54.4 |
| 8 | 63.9 |
| 9 | 70.3 |

*Example 10*

(a) 1200 grams of commercial dioctadecylamine, 306 grams of phosphorus pentasulfide, 1800 grams of No. 225 red oil and 1800 grams of No. 300 red oil were mixed and heated with agitation for four hours at 300° F. 18.3 grams of sulfur was added to the reaction mass and the mass heated with agitation for an additional two hours at 300° F.

(b) 250 grams of the above reaction mass and 31 grams of barium oxide were mixed and heated for six hours at 500° F., with agitation. The reaction mass was filtered hot. 125 grams of filtered product was obtained. It analyzed 4.45% ash.

(c) 250 grams of the reaction mass of part (a) above and 34.2 grams of barium sulfide were heated with agitation for six hours at 500° F. The reaction mass was filtered hot. 218 grams of filtered product was obtained. It analyzed 0.38% ash.

(cc) The above procedure (c) was repeated except that the reaction was carried out at a temperature of 670° F. for 30 minutes in an atmosphere of nitrogen.

*Example 11*

(a) 800 grams of commercial dioctadecylamine, 281 grams of phosphorus pentasulfide, 1200 grams of No. 225 red oil and 1200 grams of No. 300 red oil were mixed, slowly heated to 500° F. and then maintained at this temperature for 30 minutes, all while in an atmosphere of nitrogen and with agitation. The reaction mass was cooled to 300° F. 12.1 grams of sulfur was added and the mass maintained at 300° F. with agitation for one hour. The reaction mass was filtered hot. 3414 grams of dark oily product was obtained. It analyzed 4.67% sulfur and 2.26% phosphorus.

(aa) The above procedure was repeated except that 16.0 instead of 12.1 grams of sulfur was added.

(aaa) The above procedure was repeated except that 24.2 instead of 12.1 grams of sulfur was added.

(b) 3365 grams of the above filtered reaction product (a) and 479 grams of barium hydroxide octahydrate were mixed and heated with agitation at 190° F. for three hours. The reaction mass was blown with air while maintained at 200° F. for six hours and then while maintained at 250° F. for three hours. It was filtered hot. 3420 grams of a filtered homogeneous dark oily product was obtained. It was an about 25 weight per cent concentrate or solution of the additive in the red oil mixture. The concentrate analyzed 9.71% ash, 5.60% barium, 2.75% sulfur and 2.25% phosphorus.

(bb) The procedure of (b) above was repeated except that the reaction product (aa) was used.

(bbb) The procedure of (b) above was repeated except that the reaction product (aaa) was used.

Example 12

800 grams of commercial dioctadecylamine, 205 grams of phosphorus pentasulfide, 1200 grams of No. 225 red oil and 1200 grams of No. 300 red oil were mixed, slowly heated to 500° F. and maintained at this temperature with agitation for 30 minutes, all while in an atmosphere of nitrogen and with agitation. 695 grams of barium hydroxide octahydrate was then gradually added over a period of six hours while the reaction mass was agitated and maintained at this temperature. The reaction mass was then blown with air while maintained at 200° F. for six hours. The reaction mass was filtered hot. 4000 grams of a filtered liquid product was obtained. It was an about 25 weight per cent concentrate of the additive in the red oil mixture. The concentrate analyzed 7.92% ash, 4.66% barium, 2.40% sulfur and 1.56% phosphorus.

Following the procedure of Example 12, metal derivative products were prepared by varying the amounts of the reactants, as follows:

| Example No. | Amounts in grams of— | | |
| --- | --- | --- | --- |
| | Barium octahydrate | Phosphorus pentasulfide | Commercial dioctadecylamine |
| 13 | 137.0 | 42.2 | 120.0 |
| 14 | 240.0 | 231.0 | 800.0 |

To illustrate the value of the products of the invention as additives for extreme pressure lubricants, a lubricant consisting of a Mid-Continent acid treated lubricating oil base stock blended with Mid-Continent bright stock S. A. E. 50 (Oil No. 50) containing 9 weight per cent of the product of Example 1 as an additive was submitted to the standard Timken extreme pressure test. It tested 40 pounds at 800 R. P. M. The oil alone tested 15 to 20 pounds at 800 R. P. M.

As further illustrations of the value of the products of the invention, as additives to improve the extreme pressure characteristics of lubricants, compositions of standard Mid-Continent acid treated lubricating oil base stock blended with a Mid-Continent bright stock made up with the products of Examples 1, 2 and 3 showed the following values of Pressure wear index on the Shell four ball tester.

Additive

| Oil | From Example No. | Concentration in weight per cent | Pressure wear index |
| --- | --- | --- | --- |
| Oil No. 50 | 1 | 9 | 9.8 |
| No. 300 red oil | 2 | 9 | 100.2 |
| Oil No. 50 | None | 0 | Less than 2 |
| No. 300 red oil | do | 0 | Less than 5 |

In order to demonstrate the properties of the metal derivatives of the new phosphorus sulfide-amine reaction products and their metal derivatives in improving the characteristics of lubricating oils, a large number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944, published in: Industrial and Engineering Chemistry, Analytical edition, vol. 17, No. 5, May, 1945, pages 302–309. The latter paper also correlates the results of such laboratory tests with the so-called standardized "Chevrolet engine test."

Essentially the laboratory test equipment consists of a vertical, thermostatically heated, large glass test tube, into which is placed a piece of steel tubing of about one third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects those due to iron are the most important. They are empirically duplicated by the addition of a soluble iron salt. Those due to lead-bromide are duplicated by its addition. In the "Standard" test, 0.012% of iron salt is added; and in the "Iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

A 160 cubic centimeter sample of the lubricant composition
70 liters of air per hour
100 square centimeters of steel surface
4.4 square centimeters of copper-lead surface
1.0 square centimeters of copper surface
0.10% by weight of lead bromide powder
0.05% soluble iron calculated as Fe₂O₃
(Ferric 2-ethyl hexoate in C. P. benzene)

The "Iron tolerance" tests were run at 280° F. for 36 hours. The lacquer is deposited on the steel tube and is determined by difference in weight of the tube after washing with chloroform and drying to constant weight. The oil insoluble sludge remaining in the glass tube is thought to be related to similar sludge deposits in engines, and was rated visually against color photographic standards, an appearance rating scale ranging from F (worst) through A (best) being used. The corrosion was determined by difference in weight of the copper and heavy metal pieces after scrubbing with chloroform. The used oil was sufficient to enable the determination of all of the usual oil tests, viz. isopentane insolubles, viscosity, acid number, etc.

The data in the following tables shows the results obtained in testing our new additives by the tests described.

"Iron tolerance" tests on a conventional Mid-Continent acid treated lubricating oil base stock blended with Mid-Continent bright stock (S. A. E. 30), and compositions containing this oil and a high temperature phosphorus pentasulfide amine reaction product or metal derivative thereof were run on a number of the additives; the results given in the following tables are representative:

*Table I*

| Additive from Example No. | None | 1 | 2 | 3 |
|---|---|---|---|---|
| Concentration of additive in per cent by weight | None | 1.5 | 1.5 | 1.5 |
| Lacquer deposit (in milligrams) | 19.3 | 0.3 | 0.4 | 12.0 |
| Sludge (isopentane insoluble in milligrams) | 823.7 | 21.9 | 13.4 | 88.5 |
| Corrosion (in milligrams) weight loss of: | | | | |
| Copper | 2.3 | 1.2 | 37.7 | 15.1 |
| Copper-lead | 5.2 | 0.9 | −6.8 | −1.7 |
| Acid number | 8.2 | 1.1 | 6.5 | 2.9 |
| Viscosity increase (SUS) | 1,051 | 78 | 98 | 40 |
| Appearance rating | F | A | B+ | C |

These data show the marked improvement imparted to the lubricating oil by the high temperature phosphorus sulfide-amine reaction products of the invention in every indicated characteristic but one. Example 1 shows a product optimum for use in an internal combustion engine where E. P. properties are not required. Example 3 shows that reasonably good properties can be obtained with the use of a very small amount of the sulfide. When E. P. properties are wanted, and where copper corrosion is not a factor, Example 2 is excellent. Where copper corrosion is a problem, the addition of sulfur as disclosed hereinbefore, results in improvement of this characteristic also, as shown in Table III hereinafter.

*Table II(A)*

| Additive from Example No. | None | 4 | 5 | 6 |
|---|---|---|---|---|
| Concentration of Additive in per cent by weight | None | 1.5 | 1.5 | 1.5 |
| Lacquer deposit (in milligrams) | 19.3 | 0.9 | 0.3 | 0.3 |
| Sludge (isopentane insoluble in milligrams) | 823.7 | 3.5 | 0.0 | 1.6 |
| Corrosion (in milligrams) weight loss of: | | | | |
| Copper | 2.3 | 8.9 | 2.6 | 2.5 |
| Copper-lead | 5.2 | 1.7 | 1.9 | 3.7 |
| Acid number | 8.2 | 1.1 | 1.7 | 2.3 |
| Viscosity increase | 1,051 | 34 | 36 | 61 |
| Appearance rating | F | A | A | A+ |

*Table II(B)*

| Additive from Example No. | None | 7 | 8 | 9 |
|---|---|---|---|---|
| Concentration of additive in per cent by weight | None | 1.5 | 1.5 | 1.5 |
| Lacquer deposit (in milligrams) | 19.3 | 0.1 | 2.1 | 2.1 |
| Sludge (isopentane insoluble in milligrams) | 823.7 | 5.5 | 43.8 | 101.5 |
| Corrosion (in milligrams) weight loss of: | | | | |
| Copper | 2.3 | 15.8 | 0.0 | 51.8 |
| Copper-lead | 5.2 | 1.3 | 1.9 | 1.4 |
| Acid number | 8.2 | 2.4 | 3.4 | 3.0 |
| Viscosity increase | 1,051 | 67 | 75 | 87 |
| Appearance rating | F | A | B− | B− |

The data of Tables II(A) and II(B) show the improved lubricant properties imparted by phosphorus sulfide-amine additives of the invention of a wide range of ratios of phosphorus sulfide to the amine. The products of Examples 5 and 6 show marked improvement in every indicated characteristic. As stated hereinbefore, the copper corrosion characteristic of the other additives in these tables can be improved by incorporation of sulfur if desired.

*Table III*

| Additive from Example No. | None | 11(a) | 11(aa) | 11(a) | 11(aa) |
|---|---|---|---|---|---|
| Concentration of additive in per cent by weight | None | 1.0 | 1.0 | 1.5 | 1.5 |
| Lacquer deposit (in milligrams) | 19.3 | 1.0 | 0.6 | 0.9 | 0.5 |
| Sludge (isopentane insoluble in milligrams) | 823.7 | 4.5 | 43.6 | 6.5 | 8.1 |
| Corrosion (in milligrams) weight loss of: | | | | | |
| Copper | 2.3 | 1.7 | −0.3 | 1.6 | −0.1 |
| Copper-lead | 5.2 | 0.3 | 1.1 | 0.8 | 1.0 |
| Acid number | 8.2 | 0.9 | 1.0 | 1.0 | 1.1 |
| Viscosity increase | 1,051 | 33 | 50 | 33 | 36 |
| Appearance rating | F | A+ | A+ | A+ | A+ |

These data show the marked improvements in every indicated characteristic imparted to the oil by the high temperature phosphorus sulfide-amine reaction products of the invention containing added sulfur. They also show that amounts of 1.0% of the additive are very effective.

*Table IV*

| Additive from Example No. | None | 10(b) | 10(c) | 10(cc) | 11(b) | 12 |
|---|---|---|---|---|---|---|
| Concentration of additive in per cent by weight | None | 1.5 | 1.5 | 1.5 | 3.0 | 4.0 |
| Lacquer deposit (in milligrams) | 19.3 | 0.3 | 1.3 | 8.0 | 0.0 | 0.4 |
| Sludge (isopentane insoluble in milligrams) | 823.7 | 197.4 | 80 | 281.2 | 1.1 | 0.9 |
| Corrosion (in milligrams) weight loss of: | | | | | | |
| Copper | 2.3 | 1.3 | 0.1 | 1.6 | 1.0 | 0.9 |
| Copper-lead | 5.2 | 72.9 | 2.8 | 2.1 | 0.1 | −0.3 |
| Acid number | 8.2 | 3.4 | 1.5 | 4.4 | 1.2 | 0.9 |
| Viscosity increase | 1,051 | 170 | 84 | 253 | 47 | 39 |
| Appearance rating | F | A | A | C | A | A |

These data show the substantial improvements imparted to the lubricating oil by the metal derivative high temperature products of the invention. It is noteworthy that the barium sulfide derived product 10c is distinctly superior to the corresponding barium oxide derived produced 10b in all but the lacquer characteristic; and that it improves the copper-lead corrosion characteristic of the oil. Even the very high temperature additive 10cc shows significant improvements. The added-sulfur derived product, Example 11, and especially the metal derivative product, Example 12, also show additional marked improvements in all characteristics indicated.

*Table V*

| Additive from Example No. | None | 13 | 14 |
|---|---|---|---|
| Concentration of additive in per cent by weight | None | 1.5 | 4.0 |
| Lacquer deposit (in milligrams) | 19.3 | 0.0 | 0.4 |
| Sludge (isopentane insoluble in milligrams) | 823.7 | 94.1 | 0.9 |
| Corrosion (in milligrams) weight loss of: | | | |
| Copper | 2.3 | 0.4 | 2.1 |
| Copper-lead | 5.2 | 1.2 | 1.4 |
| Acid number | 8.2 | 2.4 | 1.5 |
| Viscosity increase | 1,051 | 101 | 63 |
| Appearance rating | F | A+ | A+ |

These data show the phenomenal improvements imparted to lubricants in every indicated characteristic by the metal derivative additives of the invention, especially when used in 4% concentration. The use of a 1.5% concentration gives very marked improvement in the important lacquer characteristic as well as substantially improving all the other indicated characteristics.

The standardized "Chevrolet engine test" for testing lubricating oils, referred to previously, is relatively slow and expensive. New piston rings and two new copper-lead bearing inserts are installed in the motor prior to each test. The laboratory test discussed hereinbefore is preferred where test data are wanted for a large number of samples.

In the Chevrolet engine test, the engine is a conventional Chevrolet engine with 216.5 cu. in. piston displacement and a compression ratio of 6.5 to 1. Prior to each test new piston rings and two new copper-lead bearing inserts are installed. The engine is operated at 3150 R. P. M. with a load of 30 B. H. P. and at a temperature at the jacket outlet of 200° F. The lubricating oil temperature is maintained at 265° F. for an S. A. E. 10 grade oil, and at 280° F. for oils of S. A. E. 30 to 50 grades. The fuel used contains from 2.5 to 3.0 ml. tetraethyl lead per gallon. Besides the weight loss of the test bearings, deposits in the power section, and properties of the used oil, sampled near the middle and also at the end of the test, are examined.

The test is primarily a corrosion test and corrosion standards of the art are associated with this test. A weight loss, from corrosion, of about 350 mgms. per bearing is acceptable but of course a lower weight loss is more desirable.

Although the laboratory test is the more practical way of testing a large number of samples in a relatively short time, engine tests were made on some of the additives of the invention. The added-sulfur metal derivative additives of Example 11 showed particularly desirable low corrosion characteristics. All the other characteristics tested were well within accepted values. The following Chevrolet test data are illustrative of corrosion characteristics of a Mid-Continent S. A. E. 30 oil containing 3% of the additive.

|  | Example No. | | |
| --- | --- | --- | --- |
|  | 11b | 11bb | 11bbb |
| Added sulfur (gm. atoms S/gm. mol amine) | 0.33 | 0.44 | 0.66 |
| Corrosion (weight loss in mgms./bearing) | 256 | 158 | 382 |

The intermediate sample Ex. 11bb is by far the best, the lower added sulfur sample Ex. 11b is well within the accepted standard. This low corrosion value, accompanied by all of the other desirable characteristics of the additives of the invention is indeed striking. Low corrosion is an important property in an addititve. It is not always obtained since additives which give other desirable properties often increase corrosion. Because of the diverse factors involved in achieving low insolubles, low lacquer, low viscosity increase, low corrosion, etc., it is very difficult to produce an additive which is nearly optimum for all factors, especially corrosion. The upper sample Ex. 11bbb is not within the 350 mgms./bearing standard. The latter is suitable for use where corrosion is not a major factor. By plotting the above data and drawing a smooth curve through the three points, it is determined that, when sulfur is to be added, a range of about 0.25 to about 0.64 gram atoms of sulfur per gram mol of amine in the additive is preferred, for the above standard.

In order to prevent foaming of the oil containing a small proportion of the additive it is desirable in some cases to add a very small amount of tetra-amyl silicate, or an alkyl ortho carbonate, ortho formate or ortho acetate. 0.0003% of polyalkyl-silicone oil, or 0.001% of tetra-amyl silicate was found to prevent foaming upon bubbling of air through oil containing a few per cent of the additive.

It will be obvious to one skilled in the art that sulfide-amine reaction products and similar products obtained by introducing phosphorus and/or sulfur into an amine as prepared according to different procedures but having substantially the same properties as those herein described, may be converted to metal derivatives or made up into lubricant compositions or both in accordance with the invention. The invention as claimed contemplates such compositions as set forth in the following claims.

I claim:

1. A lubricant comprising an oil dispersible reaction product of an organic amine and a phosphorous sulfide subjected to a temperature of above about 400° F. and below temperatures at which the reaction product would be decomposed.

2. An additive for lubricating oils and greases to improve their characteristics, comprising an oil dispersible reaction product of an organic amine and a phosphorus pentasulfide reacted at a temperature of above about 400° F. and below temperatures at which the reaction product would be decomposed.

3. An additive for lubricating oils and greases to improve their characteristics, comprising an oil dispersible reaction product of an organic amine and a phosphorus sulfide subjected to a temperature of above about 400° F. and below temperatures at which the reaction product would be decomposed, and which contains an added element of the sulfur family in chemical combination.

4. An additive for lubricating oils and greases to improve their characteristics, comprising an oil dispersible metal derivative of a reaction product of an organic amine and a phosphorus sulfide subjected to a temperature of above about 400° F. and below temperatures at which the reaction product would be decomposed.

5. An additive for lubricating oils and greases to improve their characteristics, comprising an oil dispersible metal derivative of a reaction product of an organic amine and phosphorus pentasulfide subjected to a temperature of above about 400° F. and below temperatures at which the reaction product would be decomposed, and which contains added sulfur in chemical combination.

6. An additive for lubricating oils and greases to improve their characteristics, comprising an oil dispersible reaction product of phosphorus pentasulfide and an organic amine having at least one amine hydrogen and a radical of at least 12 carbon atoms subjected to a temperature of above about 400° F. and not over about 600° F.

7. An additive for lubricating oils and greases to improve their characteristics, comprising an oil dispersible reaction product of phosphorus pentasulfide and an organic amine having at least one amine hydrogen and a radical of at least 12 carbon atoms subjected to a temperature of above about 400° F. and not over about 600° F. and which contains added sulfur in chemical combination.

8. An additive for lubricating oils and greases to improve their characteristics, comprising an oil dispersible metal derivative of a reaction product of phosphorus pentasulfide and an organic amine having at least one amine hydrogen and a radical of at least 12 carbon atoms subjected to a temperature of above about 400° F. and not over about 600° F.

9. An additive for lubricating oils and greases to improve their characteristics, comprising an oil dispersible metal derivative of a reaction product of phosphorus pentasulfide and an organic amine having at least one amine hydrogen and a straight chain radical of at least 12 carbon atoms subjected to a temperature of above about 400° F. and not over about 600° F. and which contains added sulfur in chemical combination.

10. An additive for lubricating oils and greases to improve their characteristics, comprising an oil dispersible reaction product of one mol of an organic amine having at least one amine hydrogen and a radical of at least 12 carbon atoms and at least about 0.5 mols of phosphorus pentasulfide subjected to a temperature of above about 400° F. and not over about 600° F.

11. An additive for lubricating oils and greases to improve their characteristics, comprising an oil dispersible reaction product of one mol of an organic amine having at least one amine hydrogen and a radical of at least 12 carbon atoms and at least about 0.5 mols of phosphorus pentasulfide subjected to a temperature of above about 400° F. and not over about 600° F. and which contains about 0.01 to 2.0 gram atoms added sulfur in chemical combination.

12. An additive for lubricating oils and greases to improve their characteristics, comprising an oil dispersible metal derivative of a reaction product of one mol of an organic amine having at least one amine hydrogen and a radical of at least 12 carbon atoms and at least about 0.5 mols of phosphorus pentasulfide subjected to a temperature of above about 400° F. and not over about 600° F. containing 0.25 to about 6.0 equivalents of the metal per mol of the sulfide reacted.

13. An additive for lubricating oils and greases to improve their characteristics, comprising an oil dispersible metal derivative of a reaction product of one mol of an organic amine having at least one amine hydrogen and a radical of at least 12 carbon atoms and at least about 0.5 mols of phosphorus pentasulfide subjected to a temperature of above about 400° F. and not over about 600° F. and which contains about 0.01 to 2.0 weight unit atoms added sulfur in chemical combination and containing 0.25 to about 6.0 equivalents of the metal per mol of the sulfide.

14. An additive for lubricating oils and greases to improve their characteristics, comprising an oil dispersible reaction product of one mol of an octadecylamine having at least one amine hydrogen and at least about 0.5 mols of phosphorus pentasulfide subjected to a temperature of above about 400° F. and not over about 600° F.

15. An additive for lubricating oils and greases to improve their characteristics, comprising an oil dispersible metal derivative of a reaction product of one mol of an octadecylamine having at least one amine hydrogen and at least about 0.5 mols of phosphorus pentasulfide subjected to a temperature of above about 400° F. and not over about 600° F. and which contains about 0.01 to 2.0 weight unit atoms added sulfur in chemical combination and containing 0.25 to about 6.0 equivalents of the metal per mol of the sulfide.

16. An additive for lubricating oils and greases to improve their characteristics, comprising an oil dispersible barium metal derivative of a reaction product of one mol of a dioctadecylamine and at least about 0.5 mols of phosphorus pentasulfide subjected to a temperature of above about 400° F. and not over about 600° F. containing 0.25 to about 6.0 equivalents of the metal per mol of the sulfide.

17. An additive for lubricating oils and greases to improve their characteristics, comprising an oil dispersible reaction product of one mol of diactadecylamine and at least about 0.5 mols of phosphorus pentasulfide subjected to a temperature of above about 400° F. and not over about 600° F. and which contains about 0.01 to 2.0 weight unit atoms added sulfur, said reaction product having been subjected after addition of added sulfur to a temperature of at least about 200° F. and not over about 600° F. for at least about a few minutes.

18. A lubricant comprising a mineral lubricating oil and from 0.05 to 10.0 weight percent of an oil dispersible reaction product of one mol of a dioctadecylamine and at least about 0.5 mols of phosphorus pentasulfide subjected to a temperature of about 500° F. and which contains about 0.01 to 2.0 gram atoms added sulfur, said reaction product having been subjected after addition of added sulfur to a temperature of at least about 200° F. and not over about 500° F. for at least about a few minutes.

19. A lubricant comprising a mineral lubricating oil and from 0.05 to 10.0 weight percent of an oil dispersible barium metal derivative of a reaction product of one mol of dioctadecylamine and at least about 0.5 mols of phosphorus pentasulfide subjected to a temperature of about 500° F. and which contains about 0.25 to about 6.0 equivalents of the metal per mol of the sulfide and about 0.01 to 2.0 gram atoms added sulfur, said reaction product having been subjected after addition of added sulfur to a temperature of at least about 200° F. and not over about 500° F. for at least about a few minutes.

JOHN D. BARTLESON.